(12) United States Patent
Harding et al.

(10) Patent No.: US 7,336,374 B2
(45) Date of Patent: Feb. 26, 2008

(54) METHODS AND APPARATUS FOR GENERATING A MASK

(75) Inventors: Kevin George Harding, Nishkayuna, NY (US); Xiaoping Qian, Clifton Park, NY (US); Russell Stephen DeMuth, Berne, NY (US)

(73) Assignee: General Electric Company, Schenectady, NY (US)

( * ) Notice: Subject to any disclaimer, the term of this patent is extended or adjusted under 35 U.S.C. 154(b) by 30 days.

(21) Appl. No.: 11/256,885

(22) Filed: Oct. 24, 2005

(65) Prior Publication Data

US 2007/0103685 A1    May 10, 2007

(51) Int. Cl.
*G01B 11/00* (2006.01)
(52) U.S. Cl. ............... 356/601; 356/604; 356/394; 250/559.39; 250/559.22
(58) Field of Classification Search ............ 356/237.2, 356/237.6, 601, 394, 612; 250/559.39, 559.22
See application file for complete search history.

(56) References Cited

U.S. PATENT DOCUMENTS

| | | | |
|---|---|---|---|
| 3,035,480 A * | 5/1962 | Teucher ............ 356/612 |
| 3,813,543 A * | 5/1974 | Naya ............ 250/559.07 |
| 4,585,947 A | 4/1986 | Liptay-Wagner et al. |
| 4,686,374 A | 8/1987 | Liptay-Wagner et al. |
| 4,808,001 A * | 2/1989 | Brenden et al. ............ 356/394 |
| 5,307,151 A | 4/1994 | Hof et al. |
| 6,028,671 A | 2/2000 | Svetkoff et al. |
| 6,064,759 A | 5/2000 | Buckley et al. |
| 6,639,685 B1 | 10/2003 | Gu et al. |
| 6,678,057 B2 | 1/2004 | Harding et al. |
| 2002/0014577 A1 | 2/2002 | Ulrich et al. |
| 2005/0111726 A1 | 5/2005 | Hackney et al. |
| 2007/0091321 A1* | 4/2007 | Hu et al. ............ 356/604 |

OTHER PUBLICATIONS

Hu, Qingying, et al., Shiny Parts Measurement Using Color Seperation, 8 page abstract, GE GRC, Schenectady, NY (Oct. 22, 2005).

* cited by examiner

*Primary Examiner*—Gregory J. Toatley, Jr.
*Assistant Examiner*—Rebecca C. Slomski
(74) *Attorney, Agent, or Firm*—William Scott Andes; Armstrong Teasdale LLP

(57) ABSTRACT

A method for generating a mask for use with a light measurement system that includes a light source for projecting light onto a surface of an object, and an imaging system for receiving light reflected from the surface of the object. The method includes determining a profile of the object to be inspected, and generating a mask based on the determined profile, wherein the mask includes an opening extending therethrough that has a profile that substantially matches a profile of the object as viewed from the light source.

20 Claims, 3 Drawing Sheets

METHODS AND APPARATUS FOR GENERATING A MASK

BACKGROUND OF THE INVENTION

This application relates generally to inspecting objects, and more specifically to methods and apparatus for generating a mask for use with inspecting an object.

Objects are sometimes inspected, for example, to determine a size and/or shape of all or a portion of the object and/or to detect defects in the object. For example, some gas turbine engine components, such as turbine or compressor blades, are inspected to detect fatigue cracks that may be caused by vibratory, mechanical, and/or thermal stresses induced to the engine. Moreover, and for example, some gas turbine engine blades are inspected for deformations such as platform orientation, contour cross-section, bow and twist along a stacking axis, thickness, and/or chord length at given cross-sections. Over time, continued operation of the object with one or more defects may reduce performance of the object and/or lead to object failures, for example, as cracks propagate through the object. Accordingly, detecting defects of the object as early as possible may facilitate increasing the performance of the object and/or reducing object failures.

To facilitate inspecting objects, at least some objects are inspected using a light measurement system that projects a structured light pattern onto the surface of the object. The light measurement system receives the structured light pattern reflected from the surface of the object and then analyzes the deformation of the reflected light pattern to calculate the surface features of the object. More specifically, during operation, the object to be inspected is sometimes coupled to a test fixture and positioned proximate to the light measurement system. A light source is then activated such that the emitted light illuminates the object. However, during operation, the light source may also illuminate at least a portion of the test fixture and/or portions of the object outside an area to be inspected, which may create inter-reflections between the object and the test fixture, and/or between an area of the object to be inspected and portions of the object outside the area to be inspected. For example, inter-reflections may be caused if the test fixture has a shape or finish that casts reflections on the object, or if the object has a relatively mirror-like finish that reflects an image of the test fixture. Such inter-reflections may result in reduced image quality and poor measurement results, possibly leading to an incorrect interpretation of surface features of the object.

Accordingly, at least one known imaging system includes a mask that is formed using duct tape for example. More specifically, duct tape is attached to the light source to facilitate reducing inter-reflections. However, the duct tape mask generally is attached to the light source in a geometric pattern that does not effectively shield the fixture from the object. Therefore, inter-reflections between the test fixture and the object, and/or between an area of the object to be inspected and portions of the object outside the area to be inspected may still be generated.

BRIEF DESCRIPTION OF THE INVENTION

In one aspect, a method is provided for generating a mask for use with a light measurement system that includes a light source for projecting light onto a surface of an object, and an imaging system for receiving light reflected from the surface of the object. The method includes determining a profile of the object to be inspected, and generating a mask based on the determined profile, wherein the mask includes an opening extending therethrough that has a profile that substantially matches a profile of the object as viewed from the light source.

In another aspect, a method for inspecting an object is provided. The method includes generating a mask that includes an opening extending therethrough that has a profile that substantially matches a profile of the object as viewed from a light source, positioning the mask between the light source and the object to be inspected, and operating the light source such that light is emitted through the mask to illuminate a portion of the object to be inspected.

In a further aspect, a structured light measurement system for inspecting an object is provided. The structured light measurement system includes a structured light source projecting structured light onto a surface of the object, an imaging system to receive structured light reflected from the surface of the object, and a mask positioned between the structured light source and the object, the mask comprising an opening extending therethrough that has a profile that substantially matches a profile of the object as viewed from the light source.

DETAILED DESCRIPTION OF THE INVENTION

Figure 1:
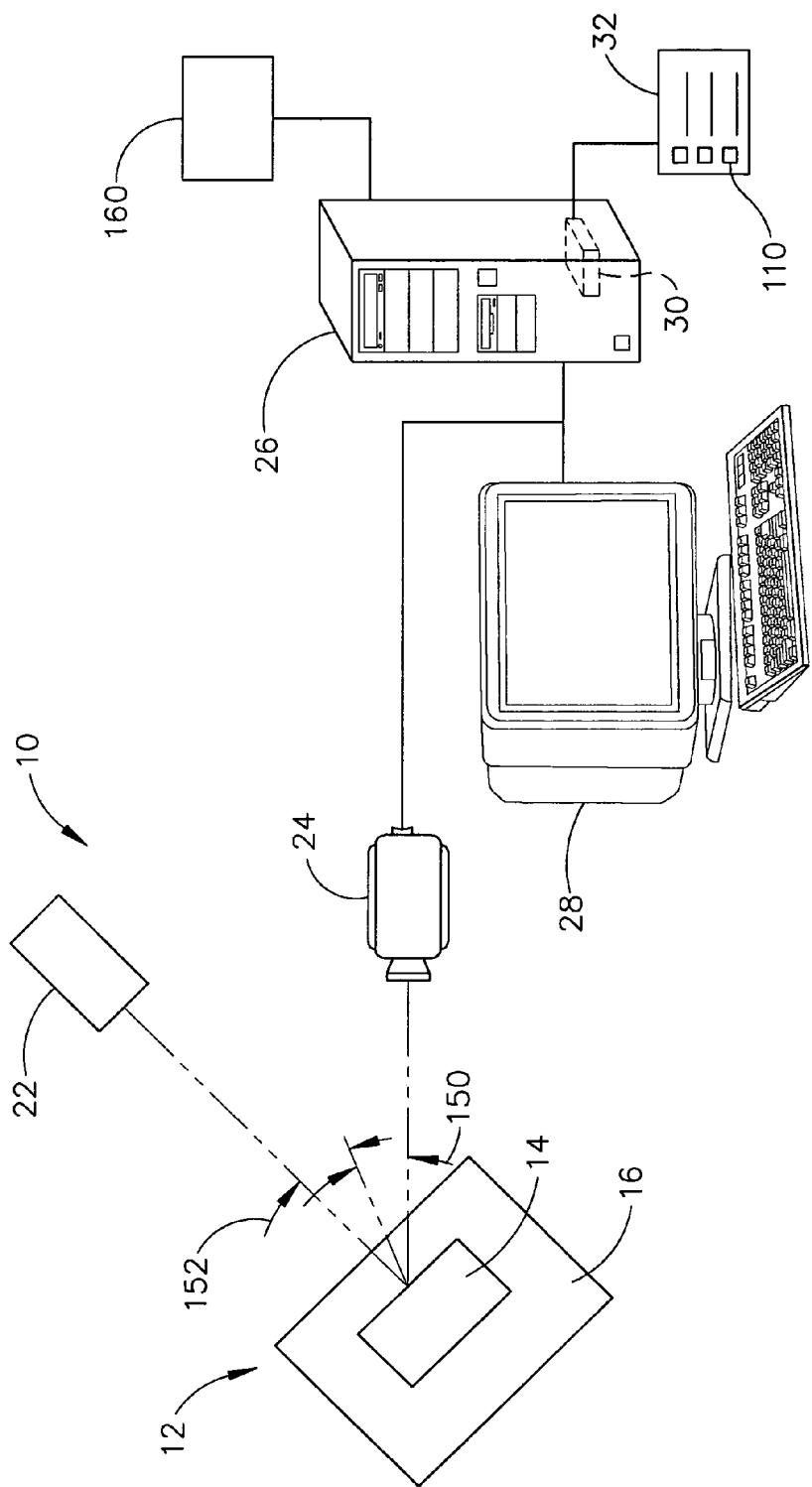
FIG. 1 is a block diagram of an exemplary embodiment of a structured light measurement system.
Figure 2:
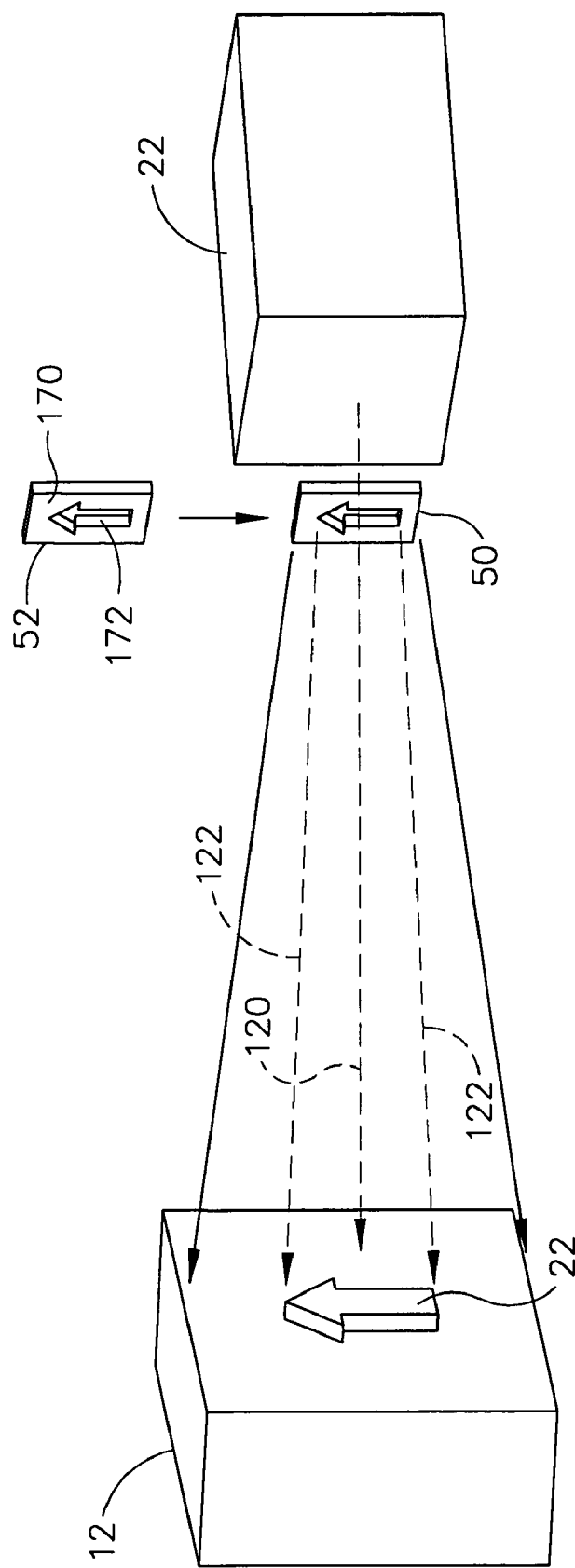
FIG. 2 is a perspective view of a portion of the system shown in FIG. 1.

FIG. 1 is a block diagram of an exemplary embodiment of a structured light measurement system 10 that is configured to measure a plurality of surface features of an object 12. For example, system 10 may be configured to inspect and determine surfaces of the object, wherein the surfaces may include features such as tilts, bends, twists, and/or warps when compared to a model representative of object 12. FIG. 2 is a perspective view of a portion of system 10 shown in FIG. 1.

In the exemplary embodiment, object 12 is a rotor blade, such as, but not limited to, a compressor or a turbine blade utilized in a gas turbine engine. Accordingly, and in the exemplary embodiment, object 12 includes an airfoil 14 extending from a platform 16. While the following description is directed to inspecting gas turbine engine blades, one skilled in the art will appreciate that system 10 may be utilized to improve structured light imaging for any object.

System 10 also includes a structured light source 22, such as, but not limited to, a laser, a white light lamp, a light emitting diode (LED), a liquid crystal display (LCD) device, a liquid crystal on silicon (LCOS) device, and/or a digital micromirror device (DMD). System 10 also includes one or more imaging sensors 24 that are each configured to receive structured light reflected from object 12. In the exemplary embodiment, imaging sensor 24 is a camera that is configured to receive structured light reflected from object 12, although other imaging sensors 24 may be used. One or more computers 26 are operatively connected to imaging sensors 24 to process images received from sensors 24, and a monitor 28 may be utilized to display information to an operator. In one embodiment, computer 26 includes a device 30, for example, a floppy disk drive, CD-ROM drive, DVD drive, magnetic optical disk (MOD) device, or any other digital device including a network connecting device such as an Ethernet device for reading instructions and/or data from a computer-readable medium 32, such as a floppy disk, a CD-ROM, a DVD or another digital source such as a network or the Internet, as well as yet to be developed digital means. In another embodiment, computer 26 executes instructions stored in firmware (not shown). Computer 26 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

During operation, an object to be inspected, i.e. object 12, is coupled to a test fixture (not shown) and positioned proximate to system 10. Light source 22 is then activated such that the emitted light illuminates object 12. However, light source 22 may also illuminate at least a portion of the test fixture and/or portions of object 12 outside an area to be inspected, which may create inter-reflections between object 12 and the test fixture, and/or between the area of object 12 to be inspected and portions of object 12 outside the area to be inspected. For example, if the test fixture has a shape or finish that casts reflections on object 12, or object 12 has a relatively mirror-like finish that reflects an image of the test fixture. Such inter-reflections may result in reduced image quality and poor measurement results, possibly leading to an incorrect interpretation of surface features of object 12.

Accordingly, and in the exemplary embodiment, system 10 also includes a mask holder 50 that is coupled to light source 22, and a mask 52 coupled to mask holder 50 such that mask 52 is positioned between light source 22 and object 12. In the exemplary embodiment, mask 52 facilitates precluding light source 22 from illuminating surfaces at locations other than portions of object 12 that are to be inspected and thereby facilitates reducing inter-reflections between the surrounding structure, such as, but not limited to, the test fixture, a floor, a ceiling, a wall, and/or the ground, and an area of object 12 to be inspected, and/or facilitates reducing inter-reflections between the area of object 12 to be inspected and portions of object 12 outside the area to be inspected. More specifically, mask 52 facilitates producing an illumination pattern on object 12 that substantially matches a shape of the area of object 12 to be inspected, i.e. a profile of object 12 to be inspected, as viewed from the location of light source 22.

Figure 3:
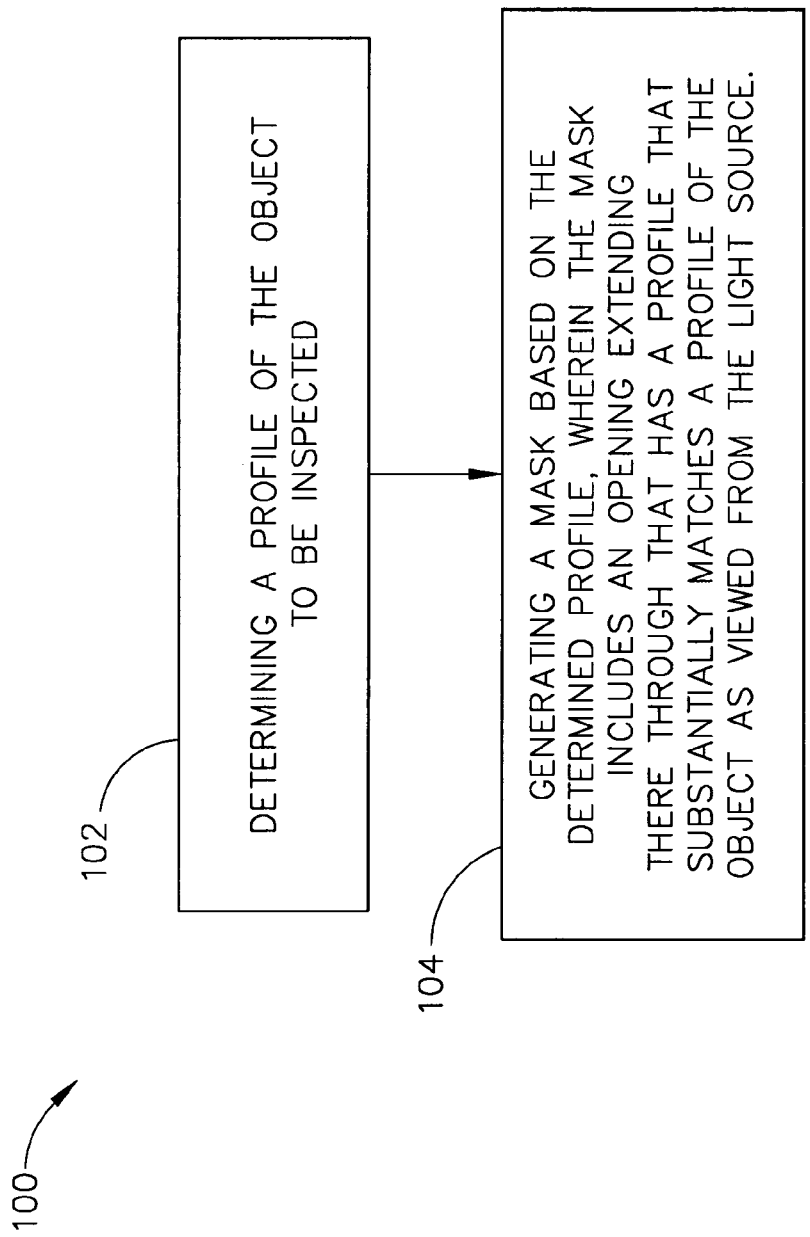
FIG. 3 is a flow chart illustrating an exemplary method of fabricating a mask that can be utilized with the systems shown in FIGS. 1 and 2.

FIG. 3 is a flowchart illustrating an exemplary method 100 of generating a mask, such as mask 52 shown in FIG. 2. In the exemplary embodiment, method 100 includes determining 102 a profile of the object to be inspected, and generating 104 a mask based on the determined profile, wherein the mask includes an opening extending therethrough that has a profile that substantially matches a profile of the object as viewed from the light source.

Accordingly, inputting 102 a plurality of parameters into a computer includes inputting a file that includes the geometry of object 12. Geometry of object 12 as used herein is defined as a three-dimensional profile of object 12 as viewed from light source 22. For example, to fabricate object 12, a computer-aided design (CAD) drawing of object 12 is generated utilizing a software that assists an operator in precision drawing. The three-dimensional CAD drawing of object 12 is then inputted into computer 26.

More specifically, a file 110 that includes the geometry of object 12 is inputted into computer 26 using device 30 for example. Method 100 also includes determining a first distance 120 that is defined between light source 22 and object 12, and determining a second distance 122 that is defined between light source 22 and mask holder 50. In the exemplary embodiment, distances 120 and 122 are determined manually by an operator and entered into computer 26. In an alternative embodiment, system 10 includes at least two sensors (not shown) that are utilized to automatically determine distances 120 and 122 and automatically entered into computer 26. Although method 100 is described with respect to entering a plurality of variables and drawings into computer 26, it should be realized that any computer can be utilized to receive the drawings and the variables to generate mask 52.

In the exemplary embodiment, computer 26 also includes a program that is configured to utilize file 110 and distances 120 and 122 to generate a mask profile. Mask profile as used herein is defined as a plurality of information such as, but not limited to, the appropriate size and shape of object 12 that can be utilized by an external system to fabricate mask 52. More specifically, the mask profile substantially matches the profile of object 12 as viewed from the perspective of light source 22.

To generate the plurality of parameters utilized by computer 26 to generate the mask profile, imaging sensor 24 is positioned at a first angle 150, or perspective, with respect to object 12, and light source 22 is positioned at a second angle 152 or second perspective, with respect to object 12. First measurement 120 between light source 22 and object 12 is then determined, and second measurement 122 between mask holder 50 and object 12 is then determined. First and second measurements 120 and 122, and object geometry profile file 110 are then inputted into computer 26, for example. Computer 26 then utilizes first and second measurements 120 and 122, and object geometry profile file 110 to perform a geometric transformation.

For example, in the exemplary embodiment, light source 22 illuminates object 12 from second angle 152, and sensor 24 receives the illuminated light reflected from object 12 at first angle 150. Accordingly, to facilitate masking at least some portions of fixture 30 such that only object 12 is substantially illuminated, mask 52 is positioned between light source 22 and object 12. Accordingly, information related to object 12, i.e. file 110, and information related to the position of object 12 in relationship to light source 22, i.e. distances 120 and 122, are geometrically transformed by computer 26 to facilitate generating the mask profile. The mask profile is then stored in a mask generating file 160 that includes a plurality of information to enable an operator to fabricate mask 52.

For example, in the exemplary embodiment, mask generating file 160 includes information such as the appropriate size and shape of mask 52 that substantially matches a projection of object 12 to mask holder 50 as seen from the perspective of light source 22. In the exemplary embodiment, mask generating file 160 is transmitted to a machine (not shown) that is configured to fabricate mask 52 utilizing mask generating file 160. For example, in one embodiment, mask generating file 160 is transmitted to a computer numerically controlled (CNC) machine. The CNC machine then utilizes mask generating file 160 to facilitate fabricating mask 52. For example, the CNC machine cuts or removes portions of a template 170 based on mask generating file 160 to form an opening 172 extending through template 170. In the exemplary embodiment, opening 172 has a profile that substantially matches a profile of object 12 as viewed from the light source 22. In an alternative embodiment, mask generating file 160 is utilized to print template 170. Portions of template 172 are then manually removed to form opening 172.

Mask 52 is then positioned in mask holder 50 such that mask 52 substantially precludes light source 22 from illuminating undesired portions of object 12 and/or fixture 30. More specifically, when mask 52 is placed in mask holder 50, mask 52 substantially precludes light source 22 from illuminating surfaces at locations other than the portion of object 12 that is to be inspected, thus reducing the inter-reflections between the surrounding structure, such as, but not limited to, the test fixture, a floor, a ceiling, a wall, and/or the ground, and an area of object 12 to be inspected, and/or reducing inter-reflections between the area of object 12 to be inspected and portions of object 12 outside the area to be inspected.

Described herein is an exemplary method and apparatus to facilitate fabricating a mask that is utilized in a light measurement system. More specifically, the method described herein can be utilized to fabricate a mask to facilitate blocking undesired reflection during the inspection/scanning of reflecting structures. In use, an input of the geometry of the object to be inspected, the stand-off distance between the light source and the object, and the distance between the light source and the mask holder are inputted into a computer. The computer then utilizes an algorithm or program installed on the computer to derive a mask shape of appropriate size and position which is then utilized to fabricate the mask. When the mask is placed in the mask holder, the mask facilitates precluding the light source from illuminating surfaces of the object at locations other than the area of the object to be inspected, thus reducing inter-reflections between the surrounding structure and the area of the object to be inspected, and/or reducing inter-reflections between the area of the object to be inspected and portions of the object outside the area to be inspected.

The mask described herein facilitates improving image quality by substantially eliminating inter-reflection between areas of the object to be inspected and surrounding structure, and/or substantially eliminating inter-reflections between the area of the object to be inspected and portions of the object outside the area to be inspected. More specifically, generating a mask that has a profile that substantially matches the profile of the object to be inspected, facilitates reducing the time required to inspect the object and also substantially eliminates undesired light from reaching the object and thus being observed by the sensors. Accordingly, the sensors receive a reduced quantity of higher quality data thus reducing image processing time. Moreover, a plurality of different objects can be inspected by inputting a three-dimensional profile of the respective object into a computer and then generating a specific mask for each object to be inspected. A technical effect of the systems and methods described herein includes facilitating improving image quality by substantially eliminating inter-reflection between areas of the object to be inspected and surrounding structure, and/or substantially eliminating inter-reflections between the area of the object to be inspected and portions of the object outside the area to be inspected.

Although the systems and methods described and/or illustrated herein are described and/or illustrated with respect to gas turbine engine components, and more specifically an engine blade for a gas turbine engine, practice of the systems and methods described and/or illustrated herein is not limited to gas turbine engine blades, nor gas turbine engine components generally. Rather, the systems and methods described and/or illustrated herein are applicable to any object.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for generating a mask for use with a light measurement system that includes a light source for projecting light onto a surface of an object, and an imaging system for receiving light reflected from the surface of the object, said method comprising:
    determining a profile of the object to be inspected; and
    fabricating a mask using the determined profile, wherein the mask includes an opening extending therethrough that has a profile that substantially matches a profile of the object as viewed from the light source.

2. A method in accordance with claim 1 further comprising:
    providing a mask template; and
    forming the opening through the mask template using the determined profile.

3. A method in accordance with claim 1 wherein determining a profile of the object to be inspected further comprises:
    inputting a geometric profile of the object into a computer; and
    performing a geometric transformation of the geometric profile to determine the profile of the object to be inspected.

4. A method in accordance with claim 3 further comprising performing a geometric transformation of the object using the geometric profile.

5. A method in accordance with claim 4 further comprising:
    determining a position of the object to be inspected with respect to the light source; and
    using the determined position to perform a geometric transformation of the object to be inspected.

6. A method in accordance with claim 5 wherein determining a position of the object further comprises:
    inputting a first distance between the light source and a mask holder into the computer;
    inputting a second distance between the light source and the object to be inspected into the computer; and
    performing a geometric transformation of the object using the first and second distances.

7. A method for inspecting an object, said method comprising:

generating a mask that includes an opening extending therethrough that has a profile that substantially matches a profile of the object as viewed from a light source;

positioning the mask between the light source and the object; and inspecting the object using the light source such that light is emitted through the mask to illuminate a portion of the object.

8. A method in accordance with claim 7 wherein generating a mask comprises:

determining a profile of the object to be inspected; and generating the mask based on the determined profile.

9. A method in accordance with claim 8 wherein generating a mask further comprises:

providing a mask template; and forming the opening through the mask template using the determined profile to facilitate fabricating the mask.

10. A method in accordance with claim 8 wherein determining a profile of the object to be inspected further comprises:

inputting a geometric profile of the object into a computer; and performing a geometric transformation of the geometric profile to determine the profile of the object to be inspected.

11. A method in accordance with claim 10 further comprising performing a geometric transformation of the object profile using the geometric profile.

12. A method in accordance with claim 11 further comprising:

determining a position of the object to be inspected with respect to the light source; and using the determined position to perform a geometric transformation of the object profile.

13. A method in accordance with claim 12 wherein determining a position of the object further comprises:

inputting a first distance between the light source and a mask holder into the computer;

inputting a second distance between the light source and the object to be inspected into the computer; and performing a geometric transformation of the object profile using the first and second distances.

14. A structured light measurement system for inspecting an object, said structured light measurement system comprising:

a structured light source projecting structured light onto a surface of the object;

an imaging system to receive structured light reflected from the surface of the object; and a mask positioned between said structured light source and the object, said mask comprising an opening extending therethrough that has a profile that substantially matches a profile of the object as viewed from said light source.

15. A structured light measurement system in accordance with claim 14 wherein the object comprises a gas turbine engine blade.

16. A structured light measurement system in accordance with claim 14 wherein said structured light source comprises at least one of a white light lamp, a laser, a light emitting diode (LED), a liquid crystal display (LCD) device, a liquid crystal on silicon (LCOS) device, and a laser.

17. A structured light measurement system in accordance with claim 14 further comprising a mask holder positioned between said structure light source and the object, said mask holder configured to receive said mask.

18. A structured light measurement system in accordance with claim 14 further comprising a computer, said computer configured to:

receive data representative of a three-dimensional geometric profile of the object; and perform a geometric transformation of the geometric profile to determine the profile of the object to be inspected as viewed from said light source.

19. A structured light system in accordance with claim 18 wherein said computer is further configured to:

receive an input representative of a distance between the object and said light source;

receive an input representative of a distance between said light source and said mask holder; and use the determined distances to perform a geometric transformation of the object profile.

20. A structured light measurement system in accordance with claim 14 further comprising a fixture configured to hold the object, said light source further configured to channel light through said mask such that said fixture is not substantially illuminated.

* * * * *